United States Patent
Ling

(10) Patent No.: US 10,097,261 B2
(45) Date of Patent: Oct. 9, 2018

(54) HOT-SWAPPABLE HARDWARE FOR WIRELESS MICROWAVE LINKS

(71) Applicant: MaxLinear, Inc., Carlsbad, CA (US)

(72) Inventor: Curtis Ling, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

(21) Appl. No.: 15/888,435

(22) Filed: Feb. 5, 2018

(65) Prior Publication Data

US 2018/0234172 A1 Aug. 16, 2018

Related U.S. Application Data

(63) Continuation of application No. 14/267,706, filed on May 1, 2014, now Pat. No. 9,887,767.

(60) Provisional application No. 61/818,204, filed on May 1, 2013, provisional application No. 61/881,016, filed on Sep. 23, 2013, provisional application No. 61/884,765, filed on Sep. 30, 2013.

(51) Int. Cl.
*H04B 7/26* (2006.01)

(52) U.S. Cl.
CPC .................. *H04B 7/2606* (2013.01)

(58) Field of Classification Search
CPC ................................... H04B 7/2606
See application file for complete search history.

(56) References Cited

U.S. PATENT DOCUMENTS

| 4,864,315 A | * | 9/1989 | Mohuchy | G01R 29/105 342/173 |
| 2006/0251115 A1 | * | 11/2006 | Haque | H04B 7/2606 370/466 |

* cited by examiner

*Primary Examiner* — Hsin-Chun Liao
(74) *Attorney, Agent, or Firm* — McAndrews, Held & Malloy, Ltd.

(57) ABSTRACT

Methods and systems are provided for replacing hardware during active communications. A replacement circuit may be added into a communication system during active communications with a link peer, with a circuit being replaced handling signals communicated with the link peer. The replacement circuit may be configured to handle a first subset of the signals communicated with the link peer, with the circuit being replaced being configured to handle a second subset of the signals communicated with the link peer. Signals of the first subset and the second subset may differ based on at least one signal related attribute. After ensuring that the replacement circuit is operating correctly, the replacement circuit may be configured to handle all signals communicated with the peer link, and the circuit being replaced may be configured for removal. The replacement circuit and the circuit being replaced may interact during the replacement sequence.

15 Claims, 4 Drawing Sheets

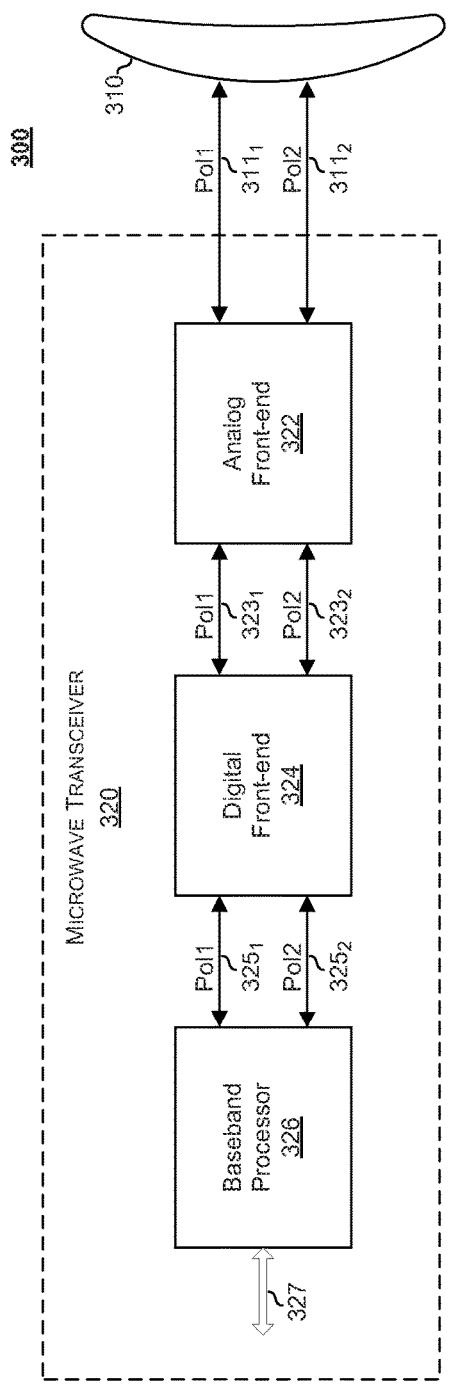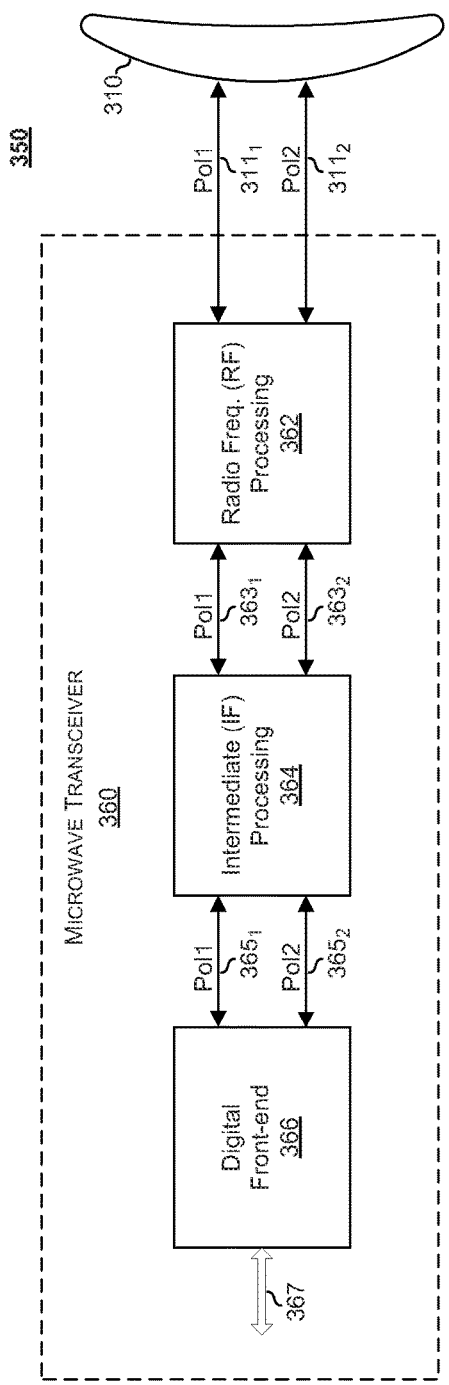

HOT-SWAPPABLE HARDWARE FOR WIRELESS MICROWAVE LINKS

CLAIM OF PRIORITY

This patent application is a continuation of U.S. patent application Ser. No. 14/267,706, filed on May 1, 2014, which makes reference to, claims priority to and claims benefit from the U.S. Provisional Patent Application Ser. No. 61/818,204, filed on May 1, 2013; U.S. Provisional Patent Application Ser. No. 61/881,016, filed on Sep. 23, 2013; and U.S. Provisional Patent Application Ser. No. 61/884,765, filed on Sep. 30, 2013. Each of the above stated applications is hereby incorporated herein by reference in its entirety.

TECHNICAL FIELD

Aspects of the present application relate to communications. More specifically, certain implementations of the present disclosure relate to methods and systems for hot-swappable hardware for wireless microwave links.

BACKGROUND

Existing methods and systems for handling microwave communications may be costly and/or inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for hot-swappable hardware for wireless microwave links, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

BRIEF DESCRIPTION OF THE DRAWINGS

FIGS. 3A and 3B illustrate example microwave communication assemblies incorporating modular microwave transceivers, in accordance with the present disclosure.

DETAILED DESCRIPTION

Certain example implementations may be found in method and system for non-intrusive noise cancellation in electronic devices, particularly in user-supported devices. As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
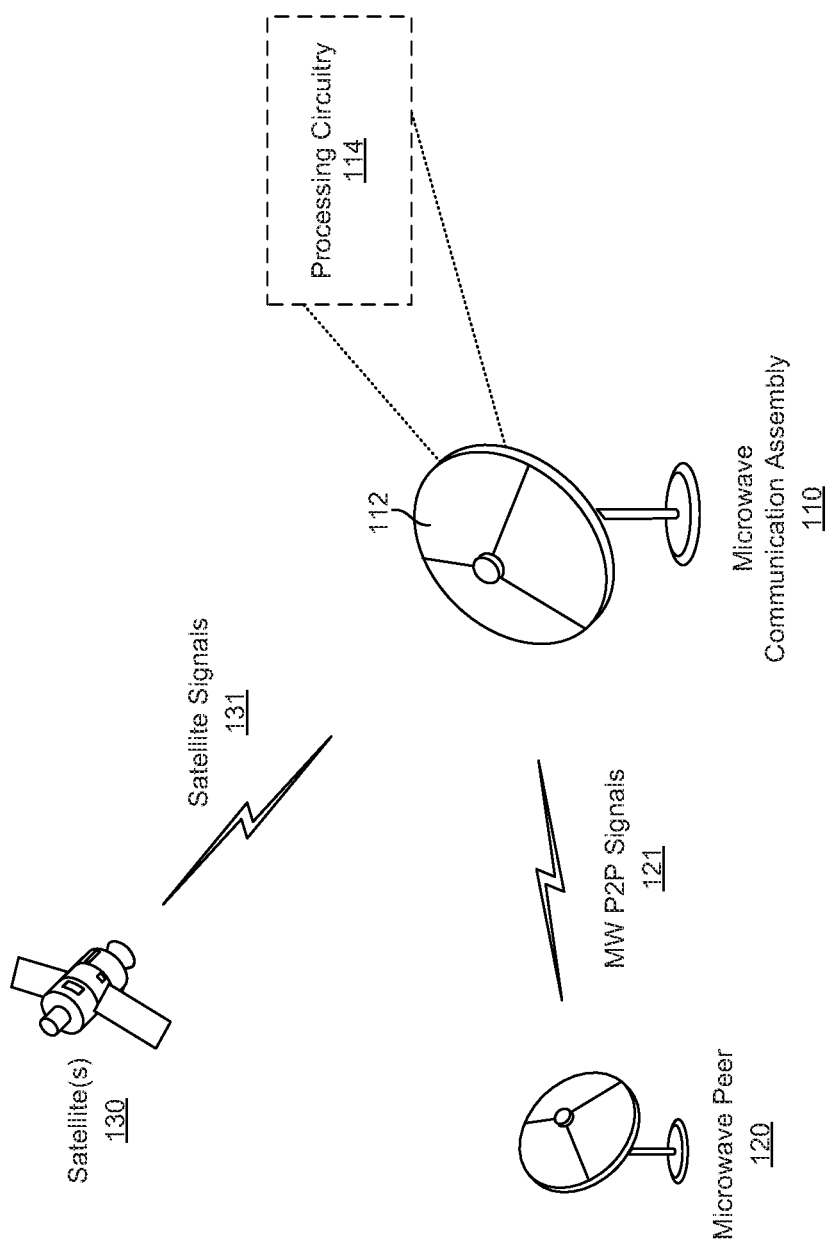
FIG. 1 illustrates an example microwave communication topology.

FIG. 1 illustrates an example microwave communication topology. Referring to Shown in FIG. 1 is a communication topology 100.

The communication topology 100 may comprise a plurality of communication elements (as well as communication related resources, such as storage resources, processing resources, routing resources, etc.) which may communicate with one another using direct and/or indirect links or connections (wireless and/or wired), in accordance with particular bands, interfaces, and/or protocols/standards.

In some instances, the communication topology 100 may be configured to support microwave communications, whereby microwave signals are used in communication (e.g., to transmit data) between communication elements. Microwave signals may comprise radio signals having wavelengths ranging between 1.0 and 30.0 cm, thus occupying part of the radio spectrum comprising frequencies in the range of ~1.0 to 30 gigahertz (GHz). Microwave communications may be particularly well suited for use in point-to-point (P2P) communications, since the relatively small wavelength of microwave signals may allow for use of conveniently-sized antennas, which may be particularly suited for transmission and/or reception of narrow beams. Thus, transmitted microwave signals may be pointed directly at receiving antenna(s). As a result, the same frequencies may be used by microwave communication equipment that may be near one another, without the communication equipment interfering with each other. Another advantage of microwave communication is that the high frequencies of microwaves may result in microwave bands having very large information-carrying capacities.

Nonetheless, there may be some limitations of microwave communications. For example, the very reasons that may make microwave particularly suited for point-to-point direct communication would limit microwave communications to line of sight (LOS) communications. In this regard, the relatively small wavelengths (and high frequencies) of microwave signals makes them unable to pass through various physical obstacles, such as mountains, as lower frequency radio waves can.

An example use scenario of typical microwave communication is shown in FIG. 1, in which the communication topology 100 may comprise a microwave communication assembly 110 and a microwave link peer 120. In this regard, the microwave communication assembly 110 may be used to facilitate point-to-point (P2P) communications with the microwave peer 120, whereby the two elements may communicate using microwave P2P signals 121.

In addition to use in terrestrial (on-Earth) P2P communications, microwave communications may also be used in conjunction with satellite communications, and in deep space radio communications. Other uses of microwaves include radars, radio navigation, sensor systems, and radio astronomy. For example, as shown in the implementation depicted in FIG. 1, the communication topology 100 may also comprise one or more satellites 130. In this regard, the microwave communication assembly 110 may be configured to communicate (e.g., receive) signals 131 communicated by the satellite(s) 130. For example, each satellite 130 may be utilized to communicate signals 131 (which typically comprise only downlink communication signals; but the disclosure is not so limited, and in some instances the signals 131 may also comprise uplink signaling). The satellite signals 131 may be configured as microwave signals.

The microwave communication assembly 110 (and similarly the microwaves peer 120) may be configured for supporting microwave communications (e.g., being installed at particular location to allow transmission and/or reception of microwave signals). For example, the microwave communication assembly 110 may comprise an antenna 112 and a processing circuitry 114. The antenna 112 may be used in receiving and/or transmitting microwave signals. For example, the antenna 112 may be a parabolic antenna (e.g., a parabolic reflector), which may be used for capturing microwave signals, such as by reflecting them into a particular point (e.g., focal point of the parabolic reflector); and/or may be used for transmitting microwave signals, such as by deflecting signals emitted from the focal point of the parabolic reflector.

The processing circuitry 114 may be operable to handle and/or process signals transmitted and/or received by the microwave communication assembly 110. The processing circuitry 114 may be incorporated into, for example, a housing that may be mounted on a boom at or near the focal point of the parabolic antenna (reflector) 112. In addition, or alternatively, the processing circuitry 114 may be coupled to the antenna 112. On the receive-side, the processing circuitry 114 may be configured to, for example, process captured microwave signals, so as to recover data carried therein, and to generate an output corresponding to the recovered data, which may be suitable for transmission to other devices that may handle use and/or distribution of the data. The distribution of the data may be made over one or more particular types of connections or links, and/or in accordance with one or more protocols. On the transmit-side, the processing circuitry 114 may be configured to, for example, receive data intended for transmission, and may process the data (or any signals carrying the data) to enable generating corresponding microwave signals (carrying the data), with the generated microwave signals being particularly configured or adapted for transmission via the antenna 112, and/or for transmission to particular intended recipient (e.g., the microwave peer 120). Example processing functions performed by the processing circuitry 114 may comprise, for example, amplification, filtering, down-conversion (e.g., RF signals to IF signals), up-conversions (e.g., IF to RF), analog-to-digital conversion and/or digital-to-analog conversion, encoding/decoding, encryption/decryption, and/or modulation/demodulation, etc.

In some instances, it may be desirable to replace components of communication elements. For example, circuitry or other hardware components of the microwave communication elements (e.g., the microwave communication assembly 110) may need to be replaced, such as when errors (or failures) occur, and/or as part of predetermined replacement schedules. Replacing circuitry or other hardware components may, however, affect communications as the element comprising the circuitry or other hardware components may be offline during that time. Accordingly, in various implementations, systems may be configured and/or implemented (and/or used) so as to allow replacing hardware components which may be pertinent to communication functions or operations without causing the communication to be offline (and/or to limit any degradation in operations). Examples of such solutions are described in more detail with respect to the following figures. Nonetheless, while some of the examples described herein pertain to microwave communications and systems used in conjunction therewith, the disclosure is not so limited, and similar approach may be applied to other types of communications and/or to systems that may be used in conjunction therewith (e.g., fiber).

Figure 2:
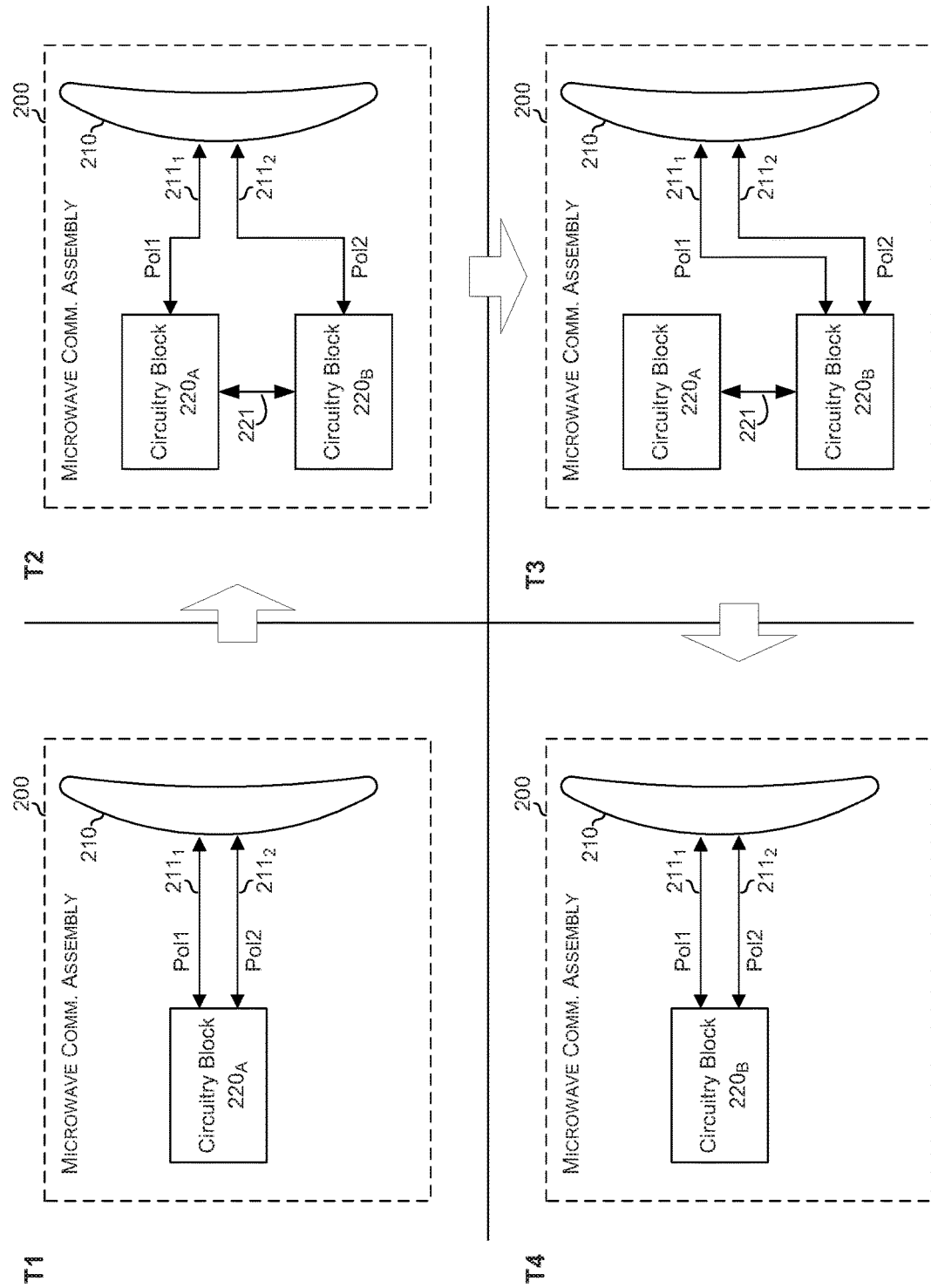
FIG. 2 illustrates hot-swap of hardware of an example microwave communication assembly, in accordance with the present disclosure.

FIG. 2 illustrates hot-swap of hardware of an example microwave communication assembly, in accordance with the present disclosure. Shown in FIG. 2 is a microwave communication assembly 200.

The microwave communication assembly 200 may correspond to the microwave communication assembly 100 of FIG. 1. In this regard, the microwave communication assembly 200 may be used in facilitating microwave communications—e.g., it may be mounted on a tower and provide a cellular backhaul link. The microwave communication assembly 200 may comprise, for example, an antenna 210 (e.g., a parabolic antenna) and suitable circuitry, which may be used to, for example, provide necessary processing operations relating to transmission and/or reception of microwave signals.

In an example implementation, the microwave communication assembly 200 may be configured to support hot-swapping of hardware resources. In this regard, the microwave communication assembly 200 may be configured to operate while hardware components thereof are being swapped (e.g., new component replacing old component) during operation (e.g., during microwave communications). An example hot-swapping sequence is described herein, whereby an old circuitry module $220_A$ is replaced by a new circuitry module $220_B$, during microwave communications by the microwave communication assembly 200. Each of the circuitry modules $220_A$ and $220_B$ may comprise suitable circuitry for performing one or more functions associated with microwave communications (e.g., functions relating to processing of microwave signals transmitted and/or received by the microwave communication assembly 200).

At T1, the microwave communication assembly 200, comprising at that point only the old circuitry module $220_A$, may be operable to receive (or transmit) microwave communications via the antenna 210, with corresponding signals being input to and/or output from the antenna 210 (via antenna connections $211_1$ and $211_2$). The corresponding signals may correspond to two different polarizations: polarization 1 and polarization 2. In this regard, an example polarization that may be used in pairs (e.g., for polarization 1 and polarization 2) may comprise horizontal and vertical (H and V) signals, right-hand circularly polarized and left-hand circularly polarized (RHCP and LHCP), and the like. The old circuitry module $220_A$ may be operable to perform at least some of the processing necessary for transmission and/or reception of the signals $211_1$ and $211_2$. It may be determined, at this point, that it is desirable to replace the circuitry module $220_A$ with a new circuitry module $220_B$, and as such a hot-swapping may be initiated. The determination to replace the old circuitry module $220_A$ may be made for a variety of reasons (e.g., the circuitry module $220_A$ is getting old and it is scheduled to be replaced before it fails; failure(s) has occurred during operation of the circuitry module $220_A$, such as failure to process signals of particular polarization, etc.)

Next, at T2, the new circuitry module $220_B$ may be added into the microwave communication assembly 200, and the link between the microwave communication assembly 200 and its link partner (not shown) may be configured to only use only one polarization (e.g., polarization 1). Thus, the other polarization (e.g., polarization 2) may be shut down without affecting the microwave link—e.g., the link may remain active, but using only polarization 1. Antenna connection $211_2$ may be disconnected from the (old) circuitry module $220_A$ and connected to the (new) circuitry module $220_B$. The circuitry module $220_B$ (and corresponding circuitry in the link partner of the microwave communication assembly 200) may be powered up and/or activated, and configured to use only polarization 2, while polarization 1 is still handled by the circuitry module $220_A$.

Next, at T3, after communications based on polarization 2 (using the circuitry module $220_B$) have been established between the microwave communication assembly 200 and its link partner, the circuitry module $220_A$ may be powered down and/or deactivated, and antenna connection $211_1$ may be disconnected from antenna 210 and connected to the circuitry module $220_B$.

Next, at T4, the circuitry module $220_B$ may be configured to support polarization 1, and a polarization 1 based link may be (re)established between the microwave communication assembly 200 and its link partner. The circuitry module $220_A$ may then be completely removed from the microwave communication assembly 200.

In some implementations, the circuitry modules $220_A$ and $220_B$ may interact during the hot-swapping sequence, such as to exchange information (or signals) that may be needed to ensure that operations in each of the modules are handled properly. In this regard, the circuitry modules $220_A$ and $220_B$ may interact via a connection 220, which may comprise any suitable, inter-module connection. For example, in some instances cross-polarization interference may occur (e.g., during time T2, where both of the circuitry modules $220_A$ and $220_B$ are being used). Such cross-polarization interference may be handled in a variety of ways during this time. In particular, the cross-polarization interference may be handled by coordinating operations of the circuitry modules $220_A$ and $220_B$, where the modules may exchange information that are available to each one of them. For example, the polarization 1 signal (of the antenna connection $211_1$) from the antenna 210 may be looped-through to the circuitry module $220_B$ via the connection 221, and the circuitry module $220_B$ may use the signal to perform cross-polarization cancellation. Additionally or alternatively, the polarization 2 signal (of the antenna connection $211_2$) from the antenna 210 may be looped through to the circuitry module $220_A$ via the connection 221, and the circuitry module $220_A$ may use the signal to perform cross-polarization cancellation. In another use example, interactions between the circuitry modules $220_A$ and $220_B$ may coordinate adjusting parameters of the signals—e.g., bandwidth and/or power of polarization 1 may ramp down while polarization 2 ramps up so as to maintain cross-polarization interference below a tolerable threshold.

Accordingly, during the hot-swapping sequence (e.g., throughout T1 through T4), the link between the microwave communication assembly 200 and its link partner may remain alive (albeit potentially at a temporarily reduced maximum bandwidth/throughput—e.g., due to use of only one polarization). While the hot-swapping sequence depicted in FIG. 2 is described with respect to microwave communications and systems used in conjunction therewith (e.g., the microwave communication assembly 200), similar approach may be applied to other types of communications (and/or to systems that may be used in conjunction therewith) where such hot-swapping sequences may be accommodated. For example, in fiber communications two different polarizations may also be used, components in systems used in conjunction with fiber communication may be also be replaced using a substantially similar hot-swapping sequence as described herein.

FIGS. 3A and 3B illustrate example microwave communication assemblies incorporating modular microwave transceivers, in accordance with present disclosure. Shown in FIGS. 3A and 3B are microwave communication assemblies 300 and 350.

The microwave communication assembly 300 of FIG. 3A may comprise an antenna 310 (which may be similar to the antenna 210) and a transceiver 320. In this regard, the transceiver 320 may correspond to and/or may be an implementation of module $210_A$ of FIG. 2. The transceiver 320 may have a modular design, such that to enable hot swapping of one or more of components of the transceiver 320. For example, transceiver 320 may comprise an analog front-end module 322, a digital front-end module 324, and a baseband processing module 326.

The microwave communication assembly 350 of FIG. 3B may comprise the antenna 310 and a transceiver 360. In this regard, the transceiver 360 may correspond to and/or may be an alternate implementation of module $210_A$ of FIG. 2. The transceiver 360 may have a modular design, such that to enable hot swapping of one or more of components of the transceiver 360. For example, transceiver 360 may comprise a radio frequency (RF) processing module 362, an intermediate frequency (IF) processing module 364, and a digital front-end module 366.

In operation, each of the microwave communication assemblies 300 and 350 may be configured for supporting hot-swapping of hardware components thereof, such as, for example, described with respect to FIG. 2. For example, each of the analog front-end module 322, the digital front-end module 324, and the baseband processing module 326 of the transceiver 320; and/or each of the RF processing module 362, the IF processing module 364, and the digital front-end module 366 of the transceiver 360 may be hot-swapped in accordance with, for example, the process described in FIG. 4.

While the communication assemblies 300 and 350 are described as being microwave assemblies, the disclosure is not so limited, and similar designs may be used to implement communication assemblies utilized in conjunction with other types of communications where components may be replaced using such hot-swapping sequences may be accommodated. For example, substantially similar communication assemblies may be implemented for use in conjunction with fiber communications (where use of multiple polarizations may also be possible) whereby components may be hot-swapped in similar manner as described with respect to the microwave communication assemblies 300 and 350.

Figure 4:
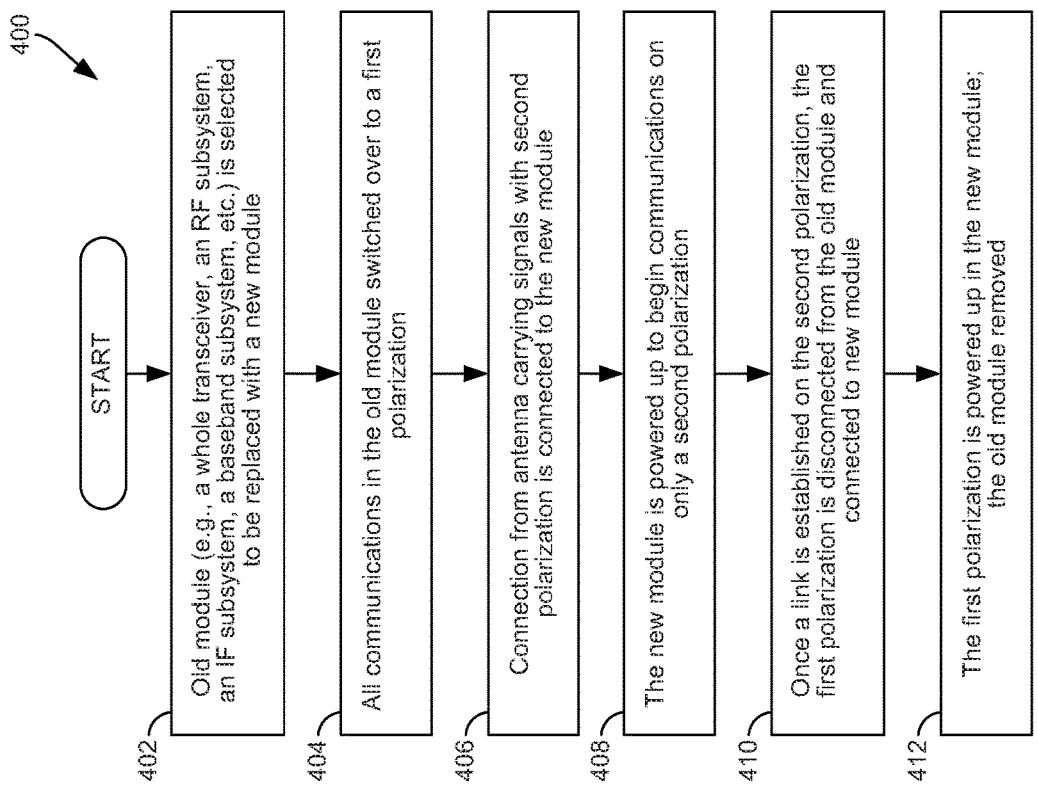
FIG. 4 is a flowchart illustrating an example process for hot-swapping hardware in microwave communication assemblies, in accordance with the present disclosure.

FIG. 4 is a flowchart illustrating an example process for hot-swapping hardware in microwave communication assemblies, in accordance with present disclosure. Referring to FIG. 4, there is shown a flow chart 400, comprising a plurality of example steps.

In step 402, a module ("old module") of a microwave assembly (e.g., the microwave communication assembly 200 of FIG. 2; or one of the microwave communication assemblies 300 and 350 of FIGS. 3A and 3B) may be selected for replacement. The module may be, for example, a whole transceiver, or any one or more of components or subsystems thereof (e.g., any of the modules 320-340 and 320-340 of FIGS. 3A and 3B). The decision to replace the module and/the selection of the module to be replaced may be based on various factors, including, for example, the module reaching the end of its life expectancy, a preset replacement date (and/or threshold) is reached, the module having already failed, etc. The old module may be replaced by a replacement module ("new module").

In step 404, all communications in the old module may be switched over to use a first polarization. In this regard, the module to be replaced (i.e., the old module) may be reconfigured to shut down or deactivate a second polarization while continuing to communicate with its link partner using the first polarization.

In step 406, a connection carrying to the module to be replaced, from the antenna of the microwave communication assembly (e.g., the antenna 310 of the microwave communication assemblies 300 and 350), signals of a second polarization (e.g., connection $211_2$ in FIG. 2; connections $321_2$, $331_2$, and/or $341_2$ in FIG. 3A; and connections $361_2$, $371_2$, and/or $381_2$ in FIG. 3B) may be connected instead to the replacement module. For example, in instances where the old module to be replaced may be a box or a printed circuit board (PCB), this step may comprise disconnecting a cable from the old module and connecting it to the replacement module. As another example, where the module to be replaced is an integrated circuit, a new integrated circuit (IC) may be plugged into a free socket on the PCB on which the old module resides.

In step 408, the replacement module may be powered up and/or configured to begin communications on the second polarization. In an example implementation, the replacement module and the old module may exchange signals to enable either or both of the modules to address issues that may arise during swapping of the modules. For example, the replacement module and the old module may exchange signals to perform cross-polarization interference cancellation while the old module is handling the first polarization and the replacement module is handling the second polarization.

In step 410, once the link has been established between the replacement module and the link partner on the second polarization, the old module is powered down. In an example implementation, the power, bandwidth, and/or other characteristics of the second polarization link may ramp up while the first polarization ramps down in order to mitigate the effects of cross-polarization interference.

In step 412, the replacement module may be configured to use (also) the first polarization such that communications using both polarizations is resumed. The old module may be removed, or may be left in place but powered down.

While the process depicted in the flow chart 400 is described with respect to microwave communications and systems used in conjunction, a substantially similar process may be used in other types of communications (and/or with respect to systems that may be used in conjunction therewith) where such hot-swapping may be accommodated. For example, because different polarization may also be used in fiber communications, the same process described herein may be applied when replacing components of systems used in conjunction with fiber communications.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for non-intrusive noise cancellation.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. Accordingly, some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method for replacing circuitry in a communication system during active operations, the method comprising:
   adding a replacement circuit into the communication system during active communications with a link peer, with a circuit being replaced handling signals communicated with the link peer;
   configuring the replacement circuit to handle a first subset of the signals communicated with the link peer, and configuring the circuit being replaced to handle a second subset of the signals communicated with the link peer, wherein signals of the first subset of signals and signals of the second subset of signals differ based on at least one signal related attribute;

after ensuring that the replacement circuit is operating correctly, configuring the replacement circuit to handle all signals communicated with the peer link, including both of the first subset and the second subset of the signals; and configuring the circuit being replaced for removal.

2. The method of claim 1, comprising coordinating operations of the replacement circuit and the circuit being replaced, during replacement of the circuit being replaced, wherein said coordinating comprises directly interacting between the replacement circuit and the circuit being replaced.

3. The method of claim 2, wherein the coordinating comprises exchanging information relating to the at least one signal related attribute.

4. The method of claim 1, comprising adaptively processing signals in one or both of the replacement circuit and the circuit being replaced based on the at least one signal related attribute.

5. The method of claim 4, wherein the processing in each of the replacement circuit and the circuit being replaced comprises applying adjustments or corrections to account for effects of signals handled in other one of the replacement circuit and the circuit being replaced, caused by the at least one signal related attribute.

6. The method of claim 1, comprising determining the circuit being replaced based on one or more replacement criteria.

7. The method of claim 6, wherein the one or more replacement criteria comprise temporal target points, performance thresholds, and/or occurrence of failures or errors.

8. The method of claim 1, wherein the at least one signal related attribute comprises polarization.

9. The method of claim 8, wherein the first subset comprises signals having a particular polarization, and the second subset comprises signaling having a different polarization.

10. The method of claim 1, wherein the signals communicated with the link peer comprise microwave signals.

11. A system that is configured for supporting replacing circuitry during active operations, the system comprising:

an antenna configured for transmitting and/or receiving signals; and one or more circuits for handling processing of signals transmitted and/or received via the antenna;

wherein, during a replacement sequence performed during active communications with a link peer:

a replacement circuit is added into the system, with a corresponding circuit being replaced from the one or more circuits, actively handling signals communicated with the link peer;

at a first stage, the replacement circuit handles a first subset of the signals communicated with the link peer, and the circuit being replaced handles a second subset of the signals communicated with the link peer, wherein signals of the first subset of signals and signals of the second subset of signals differ based on at least one signal related attribute;

at a second stage, after ensuring that the replacement circuit is operating correctly, the replacement circuit handles all signals communicated with the peer link, including both of the first subset and the second subset of the signals; and the circuit being replaced is configured for removal.

12. The system of claim 11, wherein the replacement circuit and the circuit being replaced coordinate their operations, during the replacement sequence, wherein said coordinating comprises directly interacting between the replacement circuit and the circuit being replaced.

13. The system of claim 11, wherein the replacement circuit and the circuit being replaced exchange, during the direction interaction, information relating to the at least one signal related attribute.

14. The system of claim 11, wherein one or both the replacement circuit and the circuit being replaced adaptively process signals based on the at least one signal related attribute.

15. The system of claim 14, wherein one or both the replacement circuit and the circuit being replaced apply, during the adaptive processing, adjustments or corrections to account for effects of signals handled in other one of the replacement circuit and the circuit being replaced, caused by the at least one signal related attribute.

* * * * *